United States Patent [19]

Kramer

[11] 4,222,539
[45] Sep. 16, 1980

[54] CLAMP FOR CLAMPING TUBING, WIRE BUNDLES, OR THE LIKE

[76] Inventor: Jack M. Kramer, 1942 Corning St., Los Angeles, Calif. 90034

[21] Appl. No.: 955,582

[22] Filed: Oct. 30, 1978

[51] Int. Cl.² .............................................. F16L 3/12
[52] U.S. Cl. .............................. 248/74 B; 24/243 B; 24/262
[58] Field of Search ............... 24/262, 243 R, 243 B; 24/20 LS, 73 AP, 73 PB, 81 DM, 73 SA; 248/74 B, 74 A

[56] References Cited

U.S. PATENT DOCUMENTS

| | | | |
|---|---|---|---|
| 2,709,558 | 5/1955 | Young | 248/74 B |
| 2,923,760 | 2/1960 | Famely | 248/74 B |
| 2,936,982 | 5/1960 | Cushenberry | 248/74 B |
| 2,982,505 | 5/1961 | Shy | 248/74 B |
| 3,097,561 | 7/1963 | Stein | 87/1 |
| 3,139,253 | 6/1964 | Crawford, Jr. et al. | 248/74 B |

FOREIGN PATENT DOCUMENTS

| | | | |
|---|---|---|---|
| 990925 | 6/1961 | France | 248/74 B |
| 1344734 | 10/1963 | France | 24/262 R |

*Primary Examiner*—William E. Lyddane
*Attorney, Agent, or Firm*—Edward A. Sokolski

[57] ABSTRACT

A clamp for clamping objects such as tube, wire bundles, shafts, and the like. The clamp is formed from two longitudinal strips of resilient soft material, such as a suitable woven fabric or metal, plastic or rubber material, these strips being joined together along their edges by narrow lateral strips of the same material forming resilient hinges therebetween. One of the longitudinal strips is longer than the other and has a tab member clamped to both ends thereof, the tab members being formed of a hard material such as a suitable metal. The opposing surfaces of the two longitudinal strips which are joined together are coated with a low friction non-sticking material. The clamp is wrapped around the object to be clamped with the inner surface of the longitudinal strip not having the tabs attached thereto in firm contact with the object to be clamped, and the tabs secured together with a retaining screw or the like to provide the desired clamping action. The opposing low friction surfaces of the two longitudinal strips are permitted to slide against each other with movement or expansion of the objects being clamped, thus minimizing the changes of abrasion or other damage to such object.

9 Claims, 8 Drawing Figures

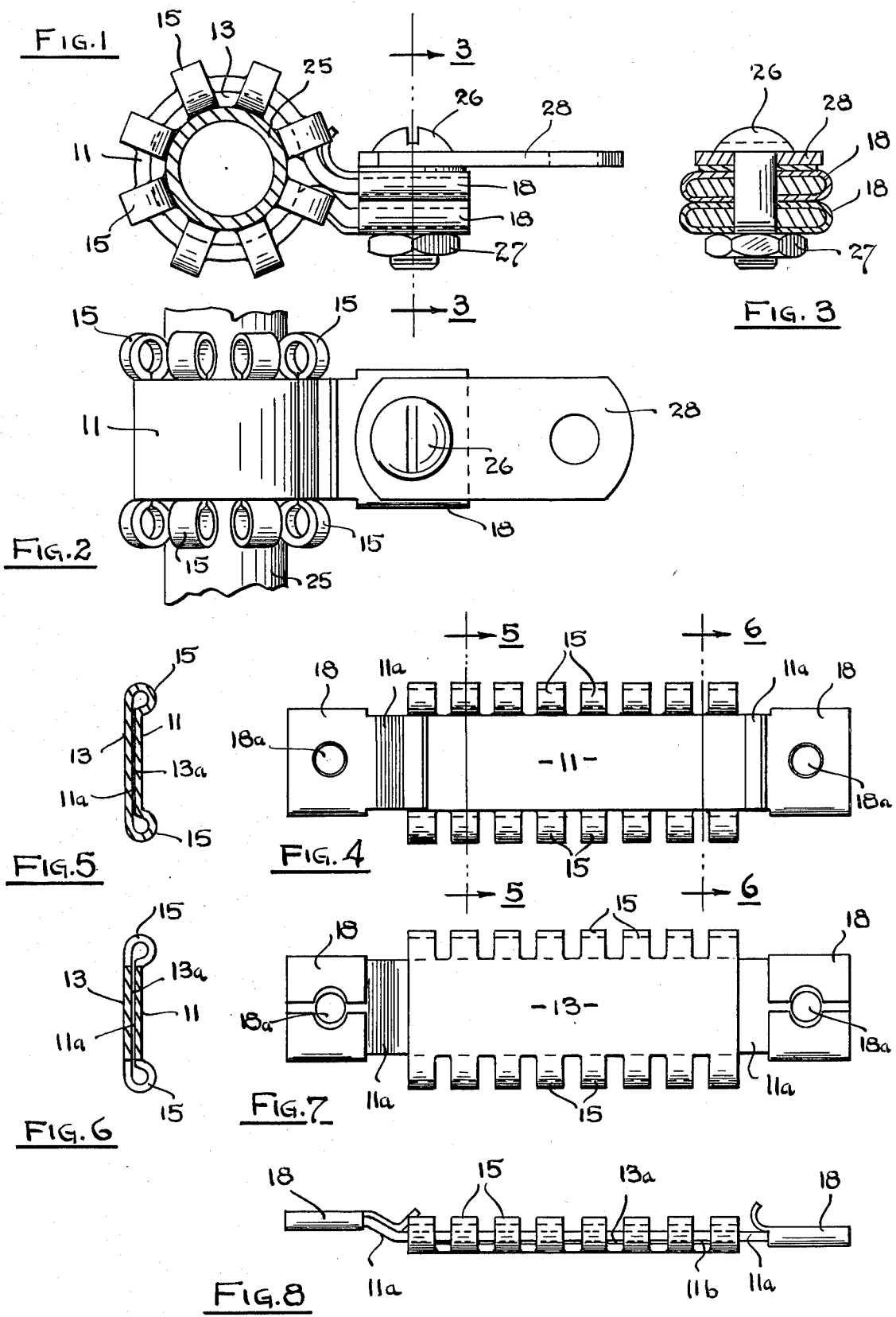

CLAMP FOR CLAMPING TUBING, WIRE BUNDLES, OR THE LIKE

This invention relates to clamps for retaining objects such as tubes or electric wire bundles, and more particularly to such a clamp employing resilient soft material for the clamping medium.

In the clamping of tubes, electric wire bundles and the like, clamps are generally employed made of either metal or a plastic having a rounded section for gripping the object to be clamped, with end tabs on the clamp on an angle tangent to the circumference of the tube, these end tabs having clearance holes therein which receive a retaining screw. Insulating strips of a soft material such as a rubber or asbestos may be placed around the arcuate section of the clamp to grip the object more securely, to isolate vibration and to avoid abrasion of the surface of the object, which in the case of tubes could result in a puncture of the surface resulting in a leak, or in the case of wire bundles could wear away the insulation. A particular problem is presented in this regard in the case of wiring and hydraulic and pneumatic tubing installed in aircraft, where severe vibration and stress conditions are oftentimes encountered. Further, in aircraft installations, large temperature changes are encountered which can cause tubing to have significant axial movement. All of these forces tend to produce a shear or bend into the clamp. If this bending moment is transmitted to the retainer screw the screw may rotate and be loosened, which increases vibration and the chance of clamp failure. In the case of a wire bundle, the forces encountered can cause the clamp to bite into the bundle and abrade away the wire insulation. Where clamps of rigid plastic are employed, it has been found that the clamps often break during service since the properties of the plastic material degrade with increasing temperature and/or vibrational stress.

The present invention overcomes the aforementioned shortcomings of the prior art by providing a clamp fabricated of a flexible material having a relatively soft surface portion which clamps against the surface of the object to be retained. The clamp is formed from a pair of longitudinal strips which are joined to each other by lateral strips forming flexible hinges between the longitudinal strips. One of the longitudinal strips forms an inner clamp portion which wraps around the object to be clamped, while the second of the longitudinal strips which is longer than the first, forms an outer clamp portion which has clamping tabs, preferably of a hard material such as steel, at the ends thereof. The opposing inner surface of the outer longitudinal strip and outer surface of the inner longitudinal strip have a low friction non-stick material such as Teflon, molybdenum disulphide, or graphite thereon such that a low friction interface is provided therebetween when the clamp is tightly secured to the object.

With the clamp installed in clamping engagement with an object to be retained and the inner longitudinal strip firmly against the surface of such object, sliding movement both longitudinally and transversely is permitted between the two longitudinal strips along their sliding interfaces, and by virtue of movement permitted by the hinge strips, this accommodates for movement of the object being clamped whether it be due to vibration, expansion or contraction with changes of temperature or other factors, such movement being taken up by relative movement between the outer and inner longitudinal strips without any significant relative movement occurring between the surfaces of the inner strip and the clamped object. In view of the fact that the clamping section is entirely fabricated of flexible material, many of the strains and stresses presented are absorbed and prevented from being transmitted to the retainer screw which could result in loosened screws, increased vibration or breakage.

It is therefore an object of this invention to lessen the likelihood of damage to objects being clamped occasioned by the clamping member.

It is a further object of this invention to provide an improved clamp for tubes, wire bundles and the like particularly suited for use in high vibration and high stress environments such as encountered in aircraft.

It is still another object of this invention to provide a flexible clamp for tubing, wire bundles and the like, having means incorporated therein for accommodating to vibratory and other movements of the clamped object.

Other objects of this invention will become apparent as the description proceeds in connection with the accompanying drawings, of which:

FIG. 1 is an end elevational view of a preferred embodiment of the invention shown clamping a tube;

FIG. 2 is a top plan view of the embodiment of FIG. 1;

FIG. 3 is a cross-sectional view taken along the plane indicated by 3—3 in FIG. 1;

FIG. 4 is a top plan view of the preferred embodiment of the invention shown in an extended position;

FIG. 5 is a cross-sectional view taken along the plane indicated by 5—5 in FIG. 4;

FIG. 6 is a cross-sectional view taken along the plane indicated by 6—6 in FIG. 5;

FIG. 7 is a bottom plan view of the preferred embodiment shown in an extended condition; and FIG. 8 is a side elevational view of the preferred embodiment shown in an extended condition.

Referring now to FIGS. 5-8, a preferred embodiment of the invention is illustrated in an extended condition. The clamp is formed from a first longitudinal strip 11 which forms an outer strip and a second longitudinal strip 13 forming an inner strip which is joined to the first strip by a plurality of transverse strips 15, forming flexible hinges between the longitudinal strips. Strips 11, 13 and 15 are formed into an integral unit either by fabrication from a single piece of material or by bonding one or more of the component parts together. Strips 11 are longer than strips 13 and have end sections 11a which extend therebeyond.

Clamped to the end portions 11a of longitudinal strip 11 are a pair of tab members 18, fabricated of a hard material such as steel. Tabs 18 have apertures 18a formed therein which mate with corresponding apertures formed in strip end portions 11a to accommodate a retainer screw, as to be described in connection with FIGS. 1-3. Strips 11, 13 and 15 are all fabricated of the same flexible material, which may be a woven material made of nylon, fiberglass, steel, copper wire, or any other material capable of being woven into a cloth-like substance. This material is preferably coated with elastomeric material or a suitable plastic, to provide relatively soft surfaces.

The inner surfaces 11b and 13a of strips 11 and 13 are coated with a low friction non-sticking material, such as molybdenum disulphide, Teflon or a graphite substance so as to provide sliding surfaces at the interface between strips 11 and 13. Transverse hinge members 15 are spaced so that the clamp may be bent around a tube or a wire bundle without kinking, the number of such transverse strips employed being variable, depending on application requirements. Thus, as few as one or two such transverse strips may be used in certain situations, while a great number of such strips as in the preferred embodiment may be used in others.

Referring now to FIGS. 1-3, the preferred embodiment of the invention is shown in use in the clamping of a tube. The clamp is wrapped around tube 25 with the inner surface of strip 13 in tight abutment against the tube surface. The tabs 18 are drawn tightly against each other by means of a screw 26 and nut 27. The low friction opposing surfaces of longitudinal strips 11 and 13 allow these strips to slide on each other with the transverse strips 15 accommodating this sliding motion, thereby accommodating relative movement between the tube and the outer strip of the clamp without there being movement and resulting abrasion between the contacting inner surface of strip 13 and the surface of the tube. It is to be noted in this regard that such relative movement is permitted both axially and circumferentially. It is further to be noted that the flexibility of the clamp permits the clamp to act as a vibration dampener and sound depressor.

The clamp thus is capable of absorbing many of the stresses and strains that would otherwise be transmitted to the retainer screw, which would result in loosened screws, increased vibration and breakage. Further, the flexibility of the clamp material allows the tabs to be easily aligned, thus facilitating installation. Also, removal and reassembly of the clamp will not adversely affect its strength or induce strains therein, as is the case in prior art metal clamps.

While the invention has been described and illustrated in detail, it is to be clearly understood that this is intended by way of example and illustration only, and is not to be taken by way of limitation, the spirit and scope of the invention being limited only by the terms of the following claims.

I claim:

1. A clamp for clamping an object to a support comprising:
   a first inner longitudinal strip of flexible material,
   a second outer longitudinal strip of flexible material, said second strip overlying the first strip and having end portions at both ends thereof which extend beyond the ends of said first strip,
   hinge means of flexible material for joining the side edges of said first strip to the side edges of said second strip, said hinge means being fixedly attached at the opposite ends thereof to each of said side edges,
   clamping tabs attached to the end portions of said second strip,
   means for drawing said clamping tabs towards each other when the clamp is wrapped around said object with the inner surface of said first strip in abutment against the outer surface of the object and the outer surface of the first strip in sliding contact with the inner surface of the second strip, and
   means for attaching the clamp to a support,
   whereby the inner strip is tightly secured to the object and relative sliding movement is permitted between the inner and outer strips along the interfaces therebetween to accommodate movement of said object relative to said support.

2. The clamp of claim 1 wherein said hinge means comprises a plurality of lateral strips joining both of the side edges of the longitudinal strips to each other.

3. The clamp of claim 2 wherein there is a substantial space between said lateral strips to permit the clamp to be bent around said object without kinking.

4. The clamp of claims 1, 2 or 3, wherein the inner surface of said second strip and the outer surfaces of said first strip have low friction.

5. The clamp of claims 1, 2 or 3 wherein the inner surface of said second strip and the outer surface of said first strip are coated with a low friction, nonstick material.

6. The clamp of claims 1, 2 or 3 wherein said clamping tabs are of a hard material and have apertures formed therein for receiving a screw.

7. A clamp for clamping an object to a support comprising:
   a first inner longitudinal strip of flexible material,
   a second outer longitudinal strip of flexible material, said second strip overlying the first strip and having end portions at both ends thereof which extend beyond the ends of said first strip,
   hinge means comprising a plurality of lateral strips of flexible material for joining the side edges of said first strip to the side edges of said second strip,
   said inner and outer strips and said hinge means being integrally formed of the same material,
   clamping tabs attached to the end portions of said second strip,
   means for drawing said clamping tabs towards each other when the clamp is wrapped around said object with the inner surface of said first strip in abutment against the outer surface of the object and the outer surface of the first strip in sliding contact with the inner surface of the second strip, and
   means for attaching the clamp to a support,
   whereby the inner strip is tightly secured to the object and relative sliding movement is permitted between the inner and outer strips along the interfaces therebetween to accommodate movement of said object relative to said support.

8. The clamp of claim 7 wherein said strips are fabricated of a woven material.

9. The clamp of claim 8 wherein said woven material is coated with a soft elastomeric material.

* * * * *